US008220847B2

(12) United States Patent
Welsch

(10) Patent No.: US 8,220,847 B2
(45) Date of Patent: Jul. 17, 2012

(54) CLOSING SEAL AND METHOD FOR MAKING THE SAME

(75) Inventor: Franz-Peter Welsch, Mechernich (DE)

(73) Assignee: Bednorz GmbH & Co. KG, Kelsterbach (DE)

( * ) Notice: Subject to any disclaimer, the term of this patent is extended or adjusted under 35 U.S.C. 154(b) by 722 days.

(21) Appl. No.: 12/087,815

(22) PCT Filed: Dec. 14, 2006

(86) PCT No.: PCT/EP2006/012025

§ 371 (c)(1), (2), (4) Date: Oct. 9, 2008

(87) PCT Pub. No.: WO2007/082576

PCT Pub. Date: Jul. 26, 2007

(65) Prior Publication Data

US 2009/0309377 A1 Dec. 17, 2009

(30) Foreign Application Priority Data

Jan. 19, 2006 (EP) .................................... 06001094

(51) Int. Cl.
*B65D 33/34* (2006.01)
*B65G 51/00* (2006.01)

(52) U.S. Cl. .................... 292/307 R; 292/317; 292/318; 292/321

(58) Field of Classification Search .............. 292/307 R, 292/317, 318, 321
See application file for complete search history.

(56) References Cited

U.S. PATENT DOCUMENTS

| | | | | | |
|---|---|---|---|---|---|
| 619,704 | A | * | 2/1899 | Brooks | 292/318 |
| 1,442,812 | A | | 1/1923 | Littleworth | |
| 1,553,146 | A | * | 9/1925 | Dinsmoor | 292/307 R |
| 1,905,139 | A | * | 4/1933 | Borland | 292/322 |
| 4,588,218 | A | * | 5/1986 | Guiler et al. | 292/307 R |
| 5,219,194 | A | | 6/1993 | Trent et al. | |
| 5,568,952 | A | * | 10/1996 | Ruegg | 292/318 |
| 5,884,949 | A | * | 3/1999 | Leon et al. | 292/318 |

FOREIGN PATENT DOCUMENTS

| | | | |
|---|---|---|---|
| DE | 19959229 | A1 | 6/2001 |
| DE | 10314940 | A1 | 10/2004 |
| FR | 2556868 | A1 | 6/1985 |
| GB | 107985 | | 7/1918 |
| GB | 2139156 | A | 11/1984 |
| GB | 2265114 | A1 | 9/1993 |

* cited by examiner

*Primary Examiner* — Carlos Lugo

(74) *Attorney, Agent, or Firm* — Price Heneveld LLP

(57) ABSTRACT

A closing seal and associated method include a closing body having a closing mechanism disposed therein, and receptacle retaining the closing body, and a first connecting member connected with one of the closing body and the receptacle. An insertion member is connected with the first connecting member and shaped for insertion into the closing member to retain the same in place. A second connecting member is connected with one of the closing body, the receptacle and the insertion member, and includes a through aperture through which the insertion member passes when the closing seal is closed.

12 Claims, 6 Drawing Sheets

CLOSING SEAL AND METHOD FOR MAKING THE SAME

BACKGROUND OF THE INVENTION

The invention relates to a closing seal and to a method for the production thereof.

Closing seals of this type are used, for example, as seals on container closures, in particular luggage containers during transportation. They constitute an ID safeguard, and therefore an identification of goods, in order to able to establish the identity at the customs. Exacting requirements should be imposed in particular on ID safeguards. Closing seals used for this purpose basically have

- to withstand normal use,
- to be easily checked and re-identified,
- to be created in such a manner that any breakage or removal leaves behind traces which can be seen with the naked eye,
- to be produced for single use, or, in the case of reusable closures, to be created in such a manner that each renewed application can be identified by means of a single sign,
- and to be provided with distinguishing marks.

Apart from these basic properties, the shape and dimensions of the closing seals may differ depending on the type of closure; however, the closures have to be dimensioned in such a manner that the distinguishing marks are readily legible. Apart from this, the closing seals have to be tamper-resistant or forge-proof. The material has to be provided in such a manner that the closing seals are not inadvertently broken or unnoticeably forged or reused.

Apart from the use of closing seals as an ID safeguard, closing seals can be used for a multiplicity of different situations. For example, postbags, boxes with lids, medicine cabinets, inspection flaps, switching cabinets, armatures, valves, etc. are sealed.

A closing seal with a closing body, a connecting element and an insertion part connected to the latter, wherein the insertion part can be inserted in the direction of insertion into a closing mechanism of the closing body and is held by the closing mechanism counter to the direction of insertion is known, for example, from DE 199 59 229 A1. Said closing seal is composed of plastic and is designed as an injection-molded part. Only a single connecting element which is connected to the closing body is provided in this case. A similar closing seal is known from DE 103 14 940 A1.

U.S. Pat. No. 5,219,194 describes a closing seal which is designed as a strip with an undercut point. The point can be inserted into a hole in the strip, the hole being arranged at a distance from the strip end assigned to the point.

Furthermore, a closing seal of "The Tyden Seal Company", Michigan, USA that is available commercially under the name "Tyden Seal" forms the prior art. This involves an ID safeguard in which a metallic closing strip has a hole in the region of one end and the closing strip is mounted in the region of its other end in a ball which has a slot for the insertion of the strip end first mentioned. The strip end which is mounted in the ball has two open metal rings. If the strip end which is provided with the hole is inserted into the ball, the two rings are displaced by said movement such that the two rings pass through the hole in the inserted end and, in the process, the rings are transferred into their closed position, and therefore the strip end which is provided with the hole cannot be pulled out of the ball.

GB 2 265 114 A discloses a plastic closing seal in which the closing body is formed by a cup-shaped receptacle, a closing mechanism which can be inserted into the receptacle and a closing cover which is connected to the receptacle via a film hinge. After the closing mechanism is inserted into the receptacle, the closing cover is inserted into the receptacle and is welded to the latter by means of ultrasound. The closing cover is provided with a through-opening such that an insertion part with front studs can be brought through the latter into engagement behind the closing mechanism. The insertion part is connected to the closing body by means of a connecting element which is designed as a plastic web.

U.S. Pat. No. 1,442,812 describes a sealing device in which a metallic container has a closing body in a region facing the cover and a side surface of the container, with an insertion opening of the closing body in the cover region of the container. A connecting element is fastened to the container in the region of the cover, with that end of the connecting element that faces away from the container being connected to an insertion part. A further connecting element is connected to the base of the container, with that end of the connecting element that faces away from the base being provided with a hole. This further connecting element can be brought such that its hole is aligned with the insertion opening of the closing body and is then inserted through the hole into the closing body in order to secure said connecting element in the insertion part.

A further closing seal is known from GB 2 139 156 A.

The closing seals discussed in respect of the prior art have the disadvantage that they do not fully satisfy the basic properties mentioned at the beginning and sometimes are also not forge-proof.

SUMMARY OF THE INVENTION

It is the object of the present invention to provide a closing seal which satisfies the basic properties mentioned at the beginning and, moreover, is tamper-indicative or forge-proof and is provided in such a manner that it cannot be inadvertently broken or unnoticeably forged or reused. It is furthermore the object of the present invention to provide a method for the production of a closing seal of this type.

One object of the invention is achieved in the case of a closing seal with a closing body, a connecting element and an insertion part connected to the latter, wherein the insertion part can be inserted in the direction of insertion into a closing mechanism of the closing body and is held counter to the direction of insertion by the closing mechanism, in that said first connecting element is connected to the closing body or to a receptacle for the closing body, and a second connecting element is connected to the closing body or to the receptacle for the closing body or to the insertion part, the second connecting element being provided with a hole, and, when the seal is closed, the insertion part passing through the hole.

In one variant of the closing seal, in which the first and the second connecting element are connected to the closing body or a receptacle for the closing body, it is therefore essential that two connecting elements emerge from a central region where the closing body or the receptacle is located, the first connecting element, to which the insertion part is connected, having the function of the lock side, whereas the second connecting element with the hole has the function of the application side. The second connecting element is preferably inserted through the receptacle, in particular through holes in the object to be sealed, and is bent back in the direction of the closing body until the hole in the second connecting element is aligned with the hole in the closing body such that, after the first connecting element is bent back, the insertion part, which is connected to the latter, can be inserted through the hole in the second connecting element into the closing mechanism of the closing body. The insertion part is held in this position by the closing mechanism counter to the direction of insertion such that the closing seal cannot be opened without destroying it.

If the closing seal is applied in this manner, the second connecting element covers the closing body and therefore the closing mechanism, and, furthermore, the first connecting element covers the second connecting element and also the closing body and therefore the closing mechanism in said region. Accordingly, the closing body and therefore the closing mechanism are not accessible for manipulations.

For the design of the closing seal for the situation in which the first connecting element is connected to the closing body or to a receptacle for the closing body and a second connecting element is connected to the closing body or to the receptacle for the closing body or to the insertion part, it is essential that the closing body or the receptacle is not located in a central region of the closing seal, based on the non-closed state of the closing seal, but rather is located in an end region. Accordingly, the insertion part can be located in the central region of the closing seal. Said closing seal can be closed in a particularly simple manner by the second connecting element with the hole only having to be placed onto the insertion part, and therefore an exclusively aligned relative position of hole and insertion part does not have to be found. The closing body then merely needs to be placed onto the second connecting element, which is placed onto the insertion part, by the first connecting element being folded back.

With the above-mentioned basic designs of the closing seal being taken into consideration, said closing seal can be designed differently. In this case, the design of the closing seal is predominantly focused on the manner of the production thereof and the materials used.

It is thus basically conceivable to produce the closing seal as a single part. In this case, the closing seal is composed in particular of plastic and is produced by injection molding.

In particular when exacting requirements have to be imposed on the security of the closing seal, the latter being used, for example, as an ID safeguard, the closing seal is preferably produced largely from metal and is of multi-part design. It is provided in particular that the closing seal is of two-part design, with the closing mechanism constituting part of the closing seal and the other functional regions of the closing seal constituting the other part.

According to one particular embodiment of the invention, it is provided that, in the case of the closing seal, the receptacle is designed as a cup, in particular cylindrical cup, with a base which receives the closing body, in particular cylindrical closing body. The design of the closing seal with the receptacle for the closing body has the advantage that the closing body can be designed as a separate functional component which only has to be inserted into the receptacle and fixed there, with the effect that the closing body cannot be removed from the receptacle without authorization. The design of the receptacle as a cup with a base can be seen in this regard. The receptacle therefore has an opening only in the region of the end which faces away from the base. The closing body is inserted through said opening into the receptacle. In the region of its opening, the cup preferably or expediently has means, in particular flanged projections, for fixing the closing body between said means and the cup base.

It is considered particularly advantageous if the receptacle, the two connecting elements and the insertion part form a component. The latter is composed in particular of metal. The single-part nature of said components rules out undetectable manipulations of said functional parts.

It is considered particularly advantageous if the two connecting elements are designed as a strip, in particular as a metal strip.

In order to securely cover the opening of the cup when the seal is closed, it is advantageous to provide the first connecting element with a widened portion in the region of the insertion part. The widened portion can likewise be produced by means of flanging such that the cup is also slightly engaged over it laterally and, accordingly, it can immediately be seen in the region of the widened portion of the first connecting element if the seal has been levered up.

The insertion part is preferably designed as a pin, in particular as a metal pin. Said pin expediently extends, with reference to its longitudinal axis, perpendicularly to the main axis of the strip-shaped first connecting element. This ensures that the two strip-shaped connecting elements come to lie tightly together with their main planes parallel to each other, and the pin is positioned perpendicularly to said main planes. Apart from the extent of the cup, the closing seal is therefore of fairly flat construction in said region and is therefore inaccessible to manipulations in said region.

The closing body can basically be of single-part design. In this case, it is composed in particular of plastic and accordingly also receives the closing mechanism which holds the insertion part counter to the direction of insertion.

According to one preferred alternative, it is provided in this case that the closing body is formed by the closing mechanism and at least one bearing element for the closing mechanism, which bearing element is held in the receptacle for the closing body. The bearing element is thus composed, for example, of plastic and the closing mechanism is composed of metal. A metallic closing mechanism of this type preferably interacts with the metallic insertion part, in particular the metallic insertion pin. The bearing element has the task of holding the closing mechanism relative to the insertion part and of transmitting the forces from the closing mechanism. When a single bearing element is used, the closing mechanism is held therein. When two bearing elements are used, the closing mechanism is positioned between the two bearing elements.

The closing mechanism can be designed in different ways. The closing mechanism is of particularly simple design and moreover guarantees a very high holding force counter to the direction of insertion of the insertion part if it is designed as a ring or disk, in particular as a self-locking ring or self-locking disk or as a snap ring. A self-locking ring or a self-locking disk is, for example, a serrated ring or a clamping disk, and, in particular, the individual serrations or individual projections of the serrated ring and clamping disk are arranged such that they are slightly inclined in the direction of insertion from the perpendicular to the direction of insertion of the insertion part or insertion pin such that maximum clamping forces arise if the insertion part is acted upon counter to the direction of insertion without authorization.

According to one further particular embodiment of the invention, it is provided that the insertion part has a hollow-cylindrical section which can be inserted into the closing mechanism of the closing body. Since, in this embodiment, the outside diameter of the hollow-cylindrical section is larger than the outside diameter of an insertion pin, higher breaking-off forces arise for the insertion part in interaction with the closing mechanism. Apart therefrom, said embodiment is more favorable with regard to the outlay on production because said variant is particularly suitable, except for the closing mechanism, for being produced from a metal sheet, in particular a single sheet-metal blank. Said sheet-metal blank is deformed, in particular deep-drawn and bent.

A particularly advantageous development of this embodiment makes provision for the closing body to be designed as a cup with a base, in particular as a cylindrical cup with a base. Said cup in particular has a recess for receiving the closing mechanism. The closing mechanism is held here between the recess and an outer inwardly flanged border of the cup. The closing mechanism is therefore secured in the cup by the outer inwardly flanged border engaging behind the closing mechanism.

In this embodiment too, it is of particular significance that, when the seal is fitted, the cup or the outer inwardly flanged border of the cup is covered by the region which surrounds the insertion part. Accordingly, there is no possibility of manipulating the insertion part or the closing mechanism without destroying the seal in this region. The closing body can be covered in a simple manner by the seal having regions widening on both sides in the region of the insertion part, and hence in the connecting region between the two connecting elements.

With regard to the production of the closing seal, it is considered particularly advantageous if at least the connecting elements and the receptacle for the closing body or that part of the closing body which receives the closing mechanism are produced from a metal sheet. The insertion part is expediently also produced from the metal sheet. A suitable sheet-metal blank should be selected for the production of said subregions of the closing seal from the metal sheet. The metal sheet is then deep-drawn and/or bent with the effect of flanging being produced. The sheet-metal blank should be selected such that flow behavior necessary for the production of those parts of the seal which are to be deep-drawn is possible. By bending or flanging border regions of the metal sheet, overlaps which are relevant for security can be produced, for example the flanging of the cup of the closing body to securely fix the closing mechanism and the flanging of that expanded portion of the metal sheet which surrounds the insertion part and, when the seal is fitted, protrudes radially over the facing border of the closing body, and therefore the insertion part and the closing mechanism cannot be manipulated without the seal being destroyed.

Further features of the invention are disclosed in the description below of the drawing, the drawing itself and in the subclaims, with it being noted that all of the features and individual features are essential to the invention.

BRIEF DESCRIPTION OF THE DRAWINGS

The drawing illustrates the invention with reference to three exemplary embodiments without being restricted thereto. In the drawing.

DETAILED DESCRIPTION OF THE PREFERRED EMBODIMENTS

For purposes of description herein, the terms “upper”, “lower”, “right”, “left”, “rear”, “front”, “vertical”, “horizontal” and derivatives thereof shall relate to the invention as oriented in FIGS. 1-5. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
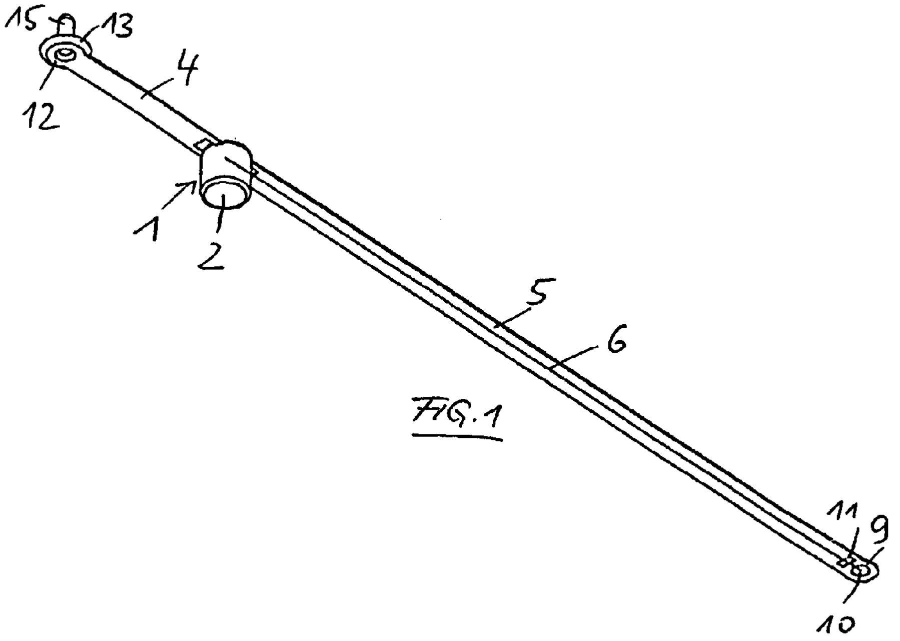
FIG. 1 shows, for a first exemplary embodiment, a three-dimensional view of the opened closing seal, seen obliquely from below.
Figure 3:
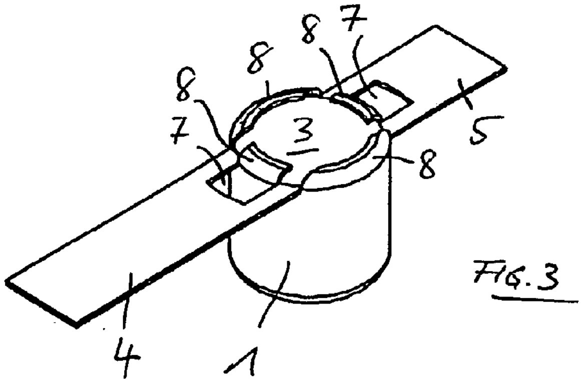
FIG. 3 shows the closing seal in the region of the receptacle and the two connecting elements, illustrated without the closing body, in a three-dimensional view, as seen obliquely from above.
Figure 4:
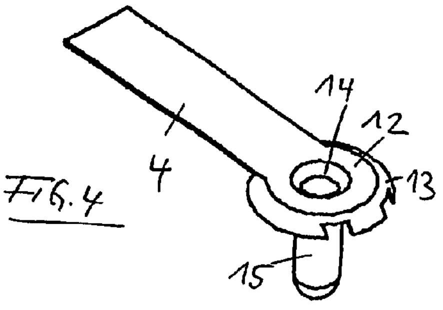
FIG. 4 shows the closing seal in the region of that end of the first connecting element which has the insertion pin, in a three-dimensional view, as seen obliquely from above.
Figure 2:
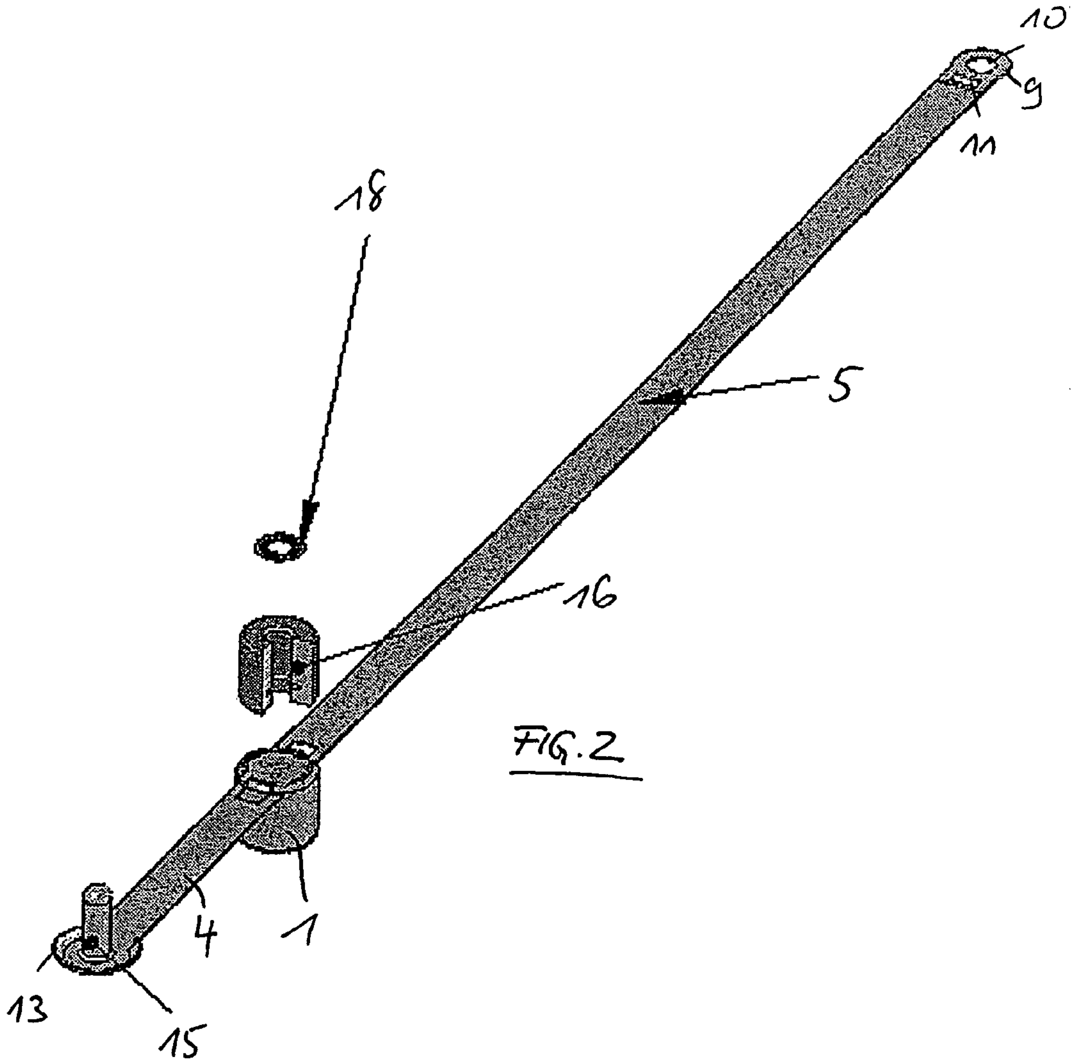
FIG. 2 shows, seen obliquely from above, the opened closing seal shown in FIG. 1, but with the bearing element and the closing mechanism which form the closing body being illustrated prior to their installation, in the manner of an exploded illustration.

The first exemplary embodiment of the closing seal according to the illustration of FIGS. 1 to 5 has a cup 1 with the base 2, with two connecting elements or members 4, 5 being connected to the cup 1 in the region of the opening 3 of the cup 1, which opening faces away from the base 2, on sides of the cup which face away from each other. The two connecting elements 4, 5 are designed as a metal strip, with the one connecting element 4, which is referred to as the first connecting element, being of substantially shorter design than the other connecting element 5, which is referred to as the second connecting element. The longitudinal axis of the connecting elements 4 and 5, which is arranged stretched out in FIG. 1, is referred to by the reference number 6. The length of the second connecting element 5 is, for example, approximately three to four times the length of the first connecting element 4.

The cup 1 and the two connecting elements 4 and 5 are produced from a metal sheet which has a suitable blank surface for the deep-drawing of the cup 1. Adjacent to the cup 1, holes 7 are punched into the two connecting elements 4 and 5, and four flanged projections 8 are provided peripherally on the cup 1 in the region of the opening 3. That end of the second connecting element 5 which faces away from the cup 1 is of an enlarged or expanded design and, in said expanded region 9, accommodates a hole 10 which passes there through the metal sheet. The connecting element 5 is provided with a further hole 11 at a small distance from the hole 10.

The first connecting element 4, is designed in the region of its end facing away from the cup 1 in such a manner that it likewise has an enlarged or expanded region 12 and furthermore has a flanged projection 13 which adjoins the expanded region 12 and extends approximately over three-quarters of a circle. Corresponding to the arrangement of the hole 10 in the second connecting element 5, the first connecting element 4 is provided with a hole 14 in the expanded region 12. An insertion element 15 is inserted into said hole 14. The insertion element 15 is designed as a metal insertion pin which is welded to the first connecting element 4.

Figure 5:
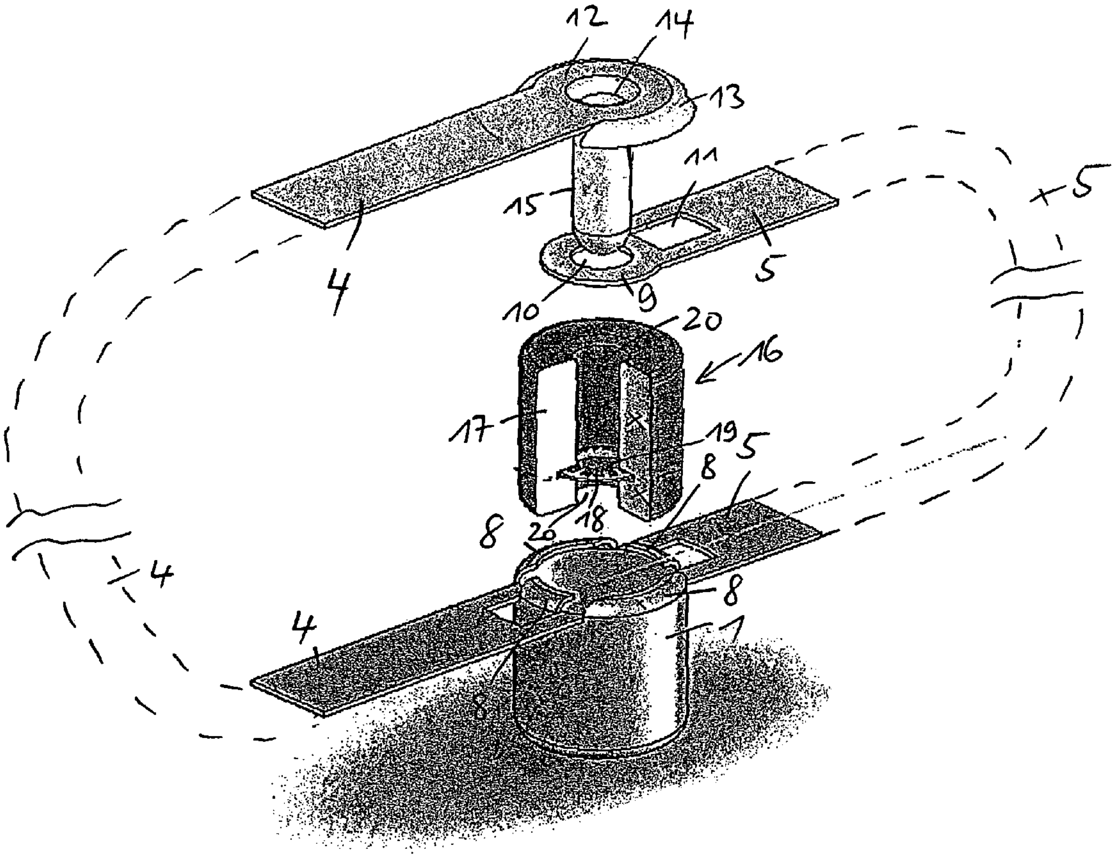
FIG. 5 shows, in an exploded illustration, those parts of the closing seal which interact with one another during the closing of the closing seal, illustrated in a three-dimensional illustration, seen obliquely from above.

As can be gathered in particular from the illustration of FIG. 5, the cup 1 serves to accommodate a closing body 16. The closing body 16 is formed by means of a bearing member or element 17, which is composed of plastic and is designed as a hollow cylinder, and a metal closing member or mechanism 18 accommodated by said bearing element. According to the exemplary embodiment, the closing mechanism 18 is a self-locking disk 18, the inner diameter of which is matched to the outer diameter of the insertion pin 15. The bearing element 17 is produced, for example, as an injection molded part, the disk 18 being embedded into the bearing element 17 directly during the production of the bearing element 17, and the disk 18 projecting with its radially inwardly directed projections into the through hole 20 which passes axially through the bearing element 17. Such a self-locking disk to which reference is made is sold, for example, by Seeger-Orbis GmbH & Co. OHG, DE-61462 Königstein. A self-locking ring (serrated ring) or a snap ring, as likewise provided by said company, would have a similar effect to the self-locking disk.

With the projections 8 still exclusively directed upward, the bearing element 17 with the closing mechanism 18 accommodated by it is inserted into the cup 1 and the flanged projections 8 are subsequently produced by means of flanging. In the process, the projections 8 are deformed radially inward, with regard to the orientation of the cup 1, as illustrated with regard to the radially inwardly deformed end position in FIG. 5. Accordingly, the closing body 16 is captured or fixed axially in the cup 1. The situation described in this respect constitutes the starting state of the opened closing seal, as illustrated in FIG. 1.

The closing seal is then inserted with the flat second connecting element 5, which only has a low height, through the object to be sealed, and the second connecting element 5, which has the function of the application side, is bent back onto the cup 1 according to the illustration of FIG. 5. In a corresponding manner, the first connecting element 4, which has the function of the closing side with the insertion pin 15, is bent back in the direction of the cup 1 according to the illustration of FIG. 5. The second connecting element 5 is placed with its expanded region 9 onto the cup and therefore onto the closing body 16 located in the cup 1, with the hole 10 of the second connecting element 5 being aligned with the hole 20 of the bearing element 17. The insertion pin 15 is then inserted through the hole 10 into the hole 20 of the bearing element 17, with the insertion pin 15 also being inserted into the closing mechanism 18, therefore into the self-locking disk. In the process, the individual projections 19 of the disk 18 that make contact with the insertion pin 15 are inclined slightly in the direction of insertion of the insertion pin 15. The insertion pin 15 is inserted into the disk 18 until the flanged projection 13 of the first connecting element 4 covers the flanged projections 8 of the cup 1. Since the flanged projections 13 also cover the second connecting element 5 in the region of the expanded region 9 thereof, said region of the closing seal is not accessible to a tool for prying or levering up the seal connection. It is therefore not possible to pull the insertion pin 15 out of the closing body 16 without damaging the seal connection, particularly since, when a force is applied to the insertion pin 15 during pulling on the connecting elements 4 and 5, the locking action of the disk 18 is increased owing to the projections 19 which then act with a radially greater force.

With the closing seal acting in an identical manner, it is conceivable for the bearing element 17 to be of a multi-part design, in particular a two-part design. In this case, instead of one hollow-cylindrical bearing element 17, the cup 1 accommodates two hollow-cylindrical bearing elements between which the closing mechanism is positioned loosely, but such that it is guided radially. The radial guidance is formed, for example, by means of a recess in one of the two bearing elements, with the diameter of the recess being slightly larger than the outer diameter of the closing mechanism 18 in the exemplary embodiment of the outer diameter of the self-locking disk.

Figure 6:
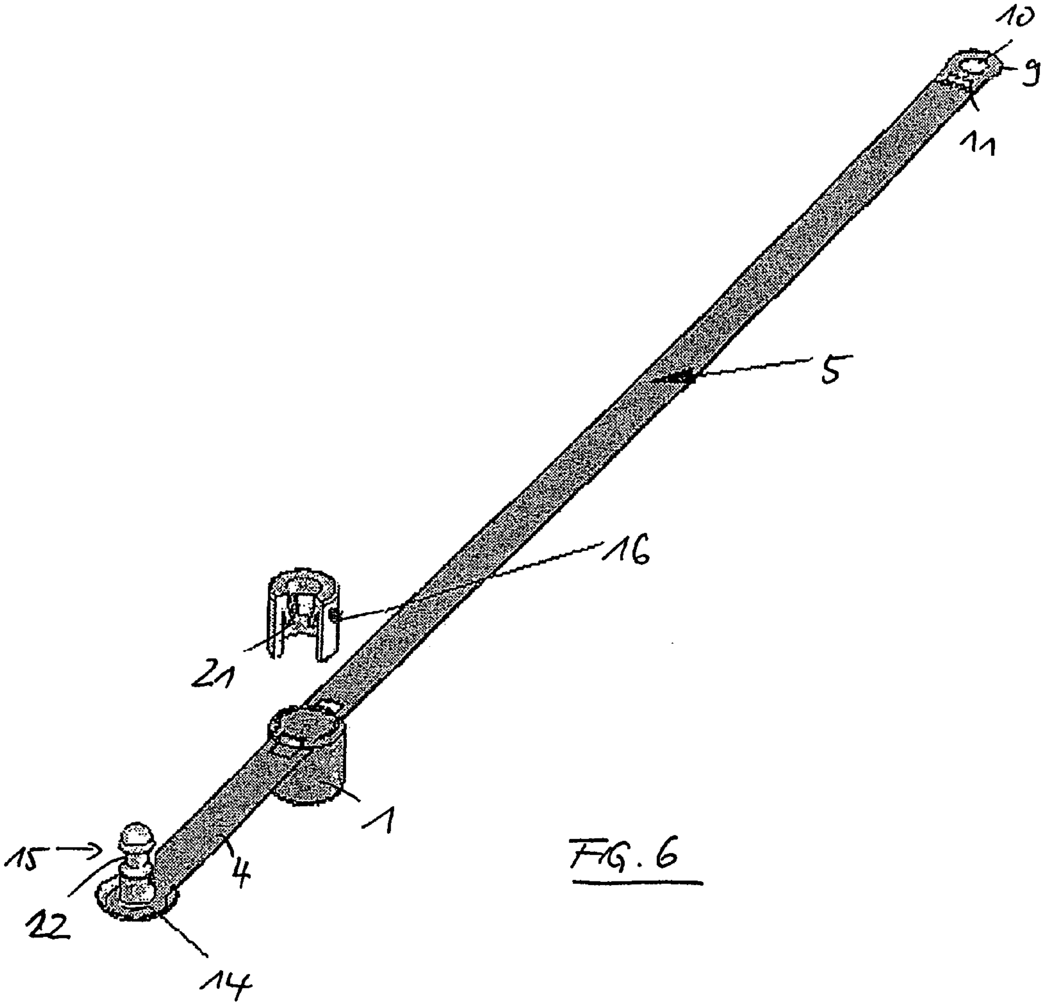
FIG. 6 shows, in a three-dimensional view comparable to the illustration according to FIG. 2, a second exemplary embodiment of the closing seal that is modified in comparison to the exemplary embodiment according to FIGS. 1 to 5.

The exemplary embodiment according to FIG. 6 differs from that according to FIGS. 1 to 5 only in that a plastic insertion pin 15 passes through the hole 14 of the first connecting element 4 and is fastened to said connecting element 4 in the region of the hole 14, and in that the closing body 16 is formed from injection molding as a single-part plastic part. Accordingly, the closing mechanism 18 is designed as a peripheral projection 21 which is directed in the direction of insertion and, when the insertion pin 15 is inserted, engages in an undercut 22 of the insertion pin 15.

The construction and manner of operation of the embodiment according to FIG. 6 otherwise corresponds to the embodiment according to FIGS. 1 to 5.

The third embodiment of the seal according to the invention is illustrated in FIGS. 7 to 10. Components or regions of the seal which correspond in their function to the embodiment according to FIGS. 1 to 5 are referred to by the same reference numbers. In this respect, reference is made to the above description in order to avoid repetition.

The seal according to the third embodiment is produced from a single sheet-metal blank. The first connecting element 4, which is designed as a strip, and the second connecting element 5, which is likewise designed as a strip, are shown. In the graphical illustration, the connecting elements 4 and 5 are illustrated in interrupted form, since their length has to be coordinated with the respective application.

The first connecting element 4 is shorter than the second connecting element 5. In the region of the one end, the second connecting element 5 is provided with the hole 10 and the other end of the connecting element 5 is connected to the plug-in part 15 which, in this embodiment, is designed as a hollow-cylindrical section 23 with a base 24. Symmetrically with respect to the longitudinal axis 6, the metal sheet is provided on both sides of the insertion element 15 with projections 25 which are arranged symmetrically with respect to the longitudinal axis 6 and the outer contour of which runs essentially concentrically with respect to the hollow-cylindrical section 23 and which open into flanged projections 13 which run perpendicularly to the sheet-metal plane of the two connecting elements 4 and 5. The outer diameter of the hollow-cylindrical section 23 is slightly larger than the inner diameter of the hole 10.

One end of the first connecting element 4 is connected to the insertion element 15 and the other end of said connecting element is connected to the closing body 16, with, in this embodiment, rather than a cup 1 being provided to accommodate a closing body 16, the closing body 16 directly forms an integral unit with the first connecting element 4 because of the single-part nature of the sheet-metal blank. The closing body 16 is designed as a cylindrical cup 26 with a base 27, the cup having a recess 28 for receiving the closing mechanism 18. The closing mechanism 18 is held between the recess 28 and an outer inwardly flanged border 29 of the cup 26. Said inwardly flanged border 29 extends approximately over three-quarters of a circle, with the ends of the inwardly flanged border extending as far as the first connecting element 4 in each case.

Figures 7, 8, 9:
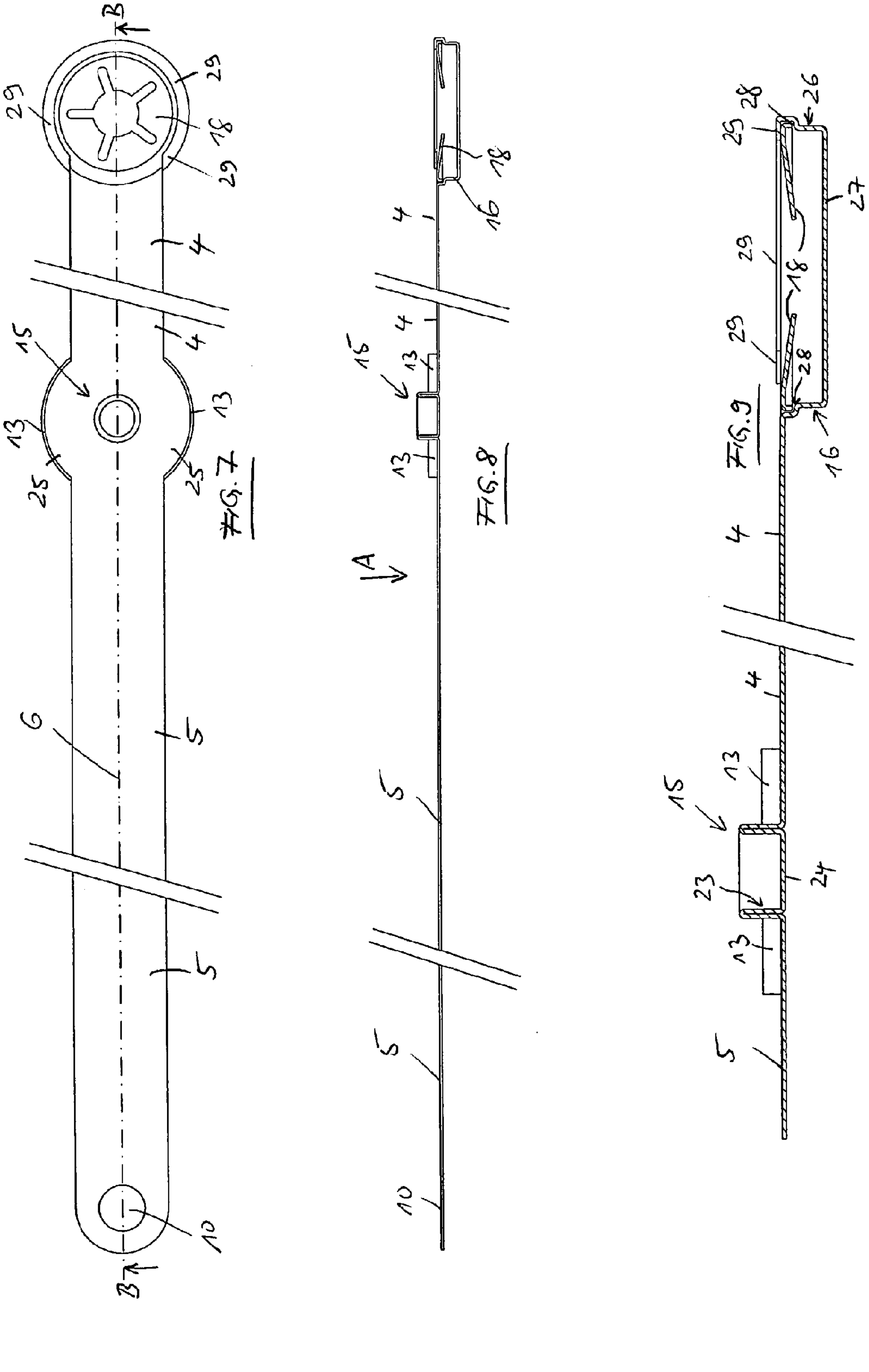
FIG. 7 shows a third exemplary embodiment of the closing seal, in a top view (view A in FIG. 8), with the (opened) seal arranged stretched longitudinally.
FIG. 8 shows a longitudinal section through the seal shown in FIG. 7, according to the line B-B in FIG. 7.
FIG. 9 shows an enlarged illustration of that region of the seal which is illustrated on the right in FIG. 8.
Figure 10:
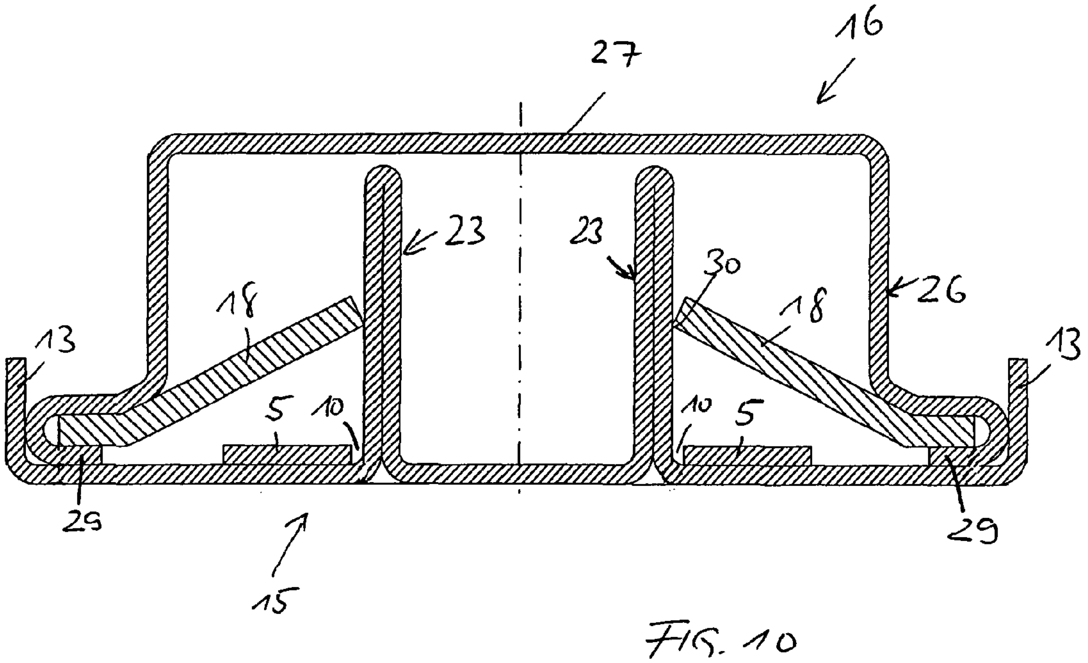
FIG. 10 shows a section transversely through the seal, in the region of the closing body, illustrated for a closed seal.

FIG. 10 shows the closed seal according to the embodiment according to FIGS. 7 to 9. Starting from the situation in FIGS. 7 and 8, the second connecting element 5 is inserted through the object to be sealed and the free end of the second connecting element 9 pivots back in such a manner that said end of the second connecting element 5 is placed onto the insertion element 15, and therefore the insertion element 15 passes through the hole 10. It is then merely necessary to fold back the closing body 16, which is connected to the insertion element 15 via the first connecting element 4, and to place it onto the insertion element 15, with the central end edges 30 of the closing mechanism 18 axially fixing the hollow-cylindrical section 23 of the insertion part 15, as can be gathered from the illustration of FIG. 10.

In this embodiment, the insertion part 15 is produced by deep-drawing of the metal sheet by double the depth of the insertion element and subsequently bending it back by the depth of the insertion element 15. The flanged projections 13 are then bent. The closing body 16 is produced by deep-drawing and the inwardly flanged borders 29 bent.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A two-piece closing seal, comprising:

an elongate, one-piece, integrally formed metal strip having mutually parallel, oppositely oriented inner and outer faces, and first and second oppositely disposed end portions with a medial portion positioned between said first and second end portions; and including:

a cylindrically shaped insertion pin formed integrally in said metal strip adjacent said medial portion, protruding outwardly away from said inner face, and having a hollow, cup-shaped interior defined by a fully closed circular pin base that is flush with said medial portion, and a folded over cylindrical pin sidewall which is integral with said pin base, has an exterior surface, and extends outwardly to a fully open top;

a connector through aperture disposed adjacent said first end portion of said metal strip, extending through both said inner and outer faces and having a circular plan shape that is closely received over said exterior surface of said insertion pin when said two-piece closing seal is in a sealed condition;

a cylindrically shaped closure body formed integrally in said metal strip adjacent said second end portion, protruding outwardly away from said outer face, and having a hollow, cup shaped interior defined by a fully closed circular body base integral with said second end portion of said metal strip, and a body sidewall which is integral with said body base and extends outwardly to an enlarged rim surface with an axially adjacent mounting flange protruding radially inwardly therefrom; and a self-locking closing disk having a generally circular plan shape with an outer marginal edge portion securely retained between said rim surface and said mounting flange on said closure body, and a central aperture with radially inwardly protruding locking fingers with end edges that abuttingly engage said exterior surface of said insertion pin during assembly, and securely retain said two-piece closing seal in said sealed condition, whereby said first end portion of said metal strip is inserted through a portion of an article to be sealed, then flexed inwardly toward said medial portion, with said through aperture received over said insertion pin, and said second end portion of said metal strip is flexed inwardly toward said medial portion with said closure body and said closing disk mounted therein pressed onto said insertion pin over said first end portion of said metal strip, such that said locking fingers on said closing disk abuttingly engage said outside surface of said insertion pin to securely retain said two-piece closing seal in said sealed condition.

2. A two-piece closing seal as set forth in claim 1, wherein:

said one-piece, integrally formed metal strip includes at least one flange projection protruding outward from said inner face of said metal strip, having an arcuate plan shape substantially similar to the plan shape of said body sidewall of said closure body, and disposed generally concentric with said insertion pin, whereby in said sealed condition, said flange projection blocks access to at least an adjacent portion of said mounting flange on said closure body to resist tampering.

3. A two-piece closing seal as set forth in claim 2, wherein:

said one-piece, integrally formed metal strip includes a pair of said flange projections protruding outward from said inner face of said metal strip on opposite sides of said insertion pin, having an arcuate plan shape substantially similar to the plan shape of said body sidewall of said closure body, and disposed generally concentric with said insertion pin, whereby in said sealed condition, said flange projections block access to opposed sides of said mounting flange on said closure body to resist tampering.

4. A two-piece closing seal as set forth in claim 3, wherein:

said first end portion of said metal strip has a predetermined width measured between opposing side edges thereof; and said closure body is laterally centered on said second end portion of said metal strip, and has an outside diameter that is greater than said predetermined width of said first end portion of said metal strip, such that at least portions of said body sidewall protrude laterally outwardly from said opposed side edges of said metal strip to provide additional sealing strength.

5. A two-piece closing seal as set forth in claim 4, wherein:

said medial portion of said metal strip includes a laterally enlarged region disposed adjacent said insertion pin which protrudes laterally outwardly from both of said side edges of said metal strip; and said pair of flange projections are supported on said enlarged region, have an inside diameter that is slightly larger than the outside diameter of said closure body, and are closely received between said flange projections in said sealed condition to provide additional sealing strength and tamper resistance.

6. A two-piece closing seal, comprising:

an elongate, one-piece, integrally formed metal strip having mutually parallel, oppositely oriented inner and outer faces, and first and second oppositely disposed end portions with a medial portion positioned between said first and second end portions; and including:

a cylindrically shaped insertion pin formed integrally in said metal strip adjacent said medial portion, protruding outwardly away from said inner face, and having a hollow, cup-shaped interior defined by a fully closed circular pin base that is flush with said medial portion, and a folded over cylindrical pin sidewall which is integral with said pin base, has an exterior surface, and extends outwardly to a fully open top;

a connector through aperture disposed adjacent said first end portion of said metal strip, extending through both said inner and outer faces and having a circular plan shape that is closely received over said exterior surface of said insertion pin when said two-piece closing seal is in a sealed condition;

a cylindrically shaped closure body formed integrally in said metal strip adjacent said second end portion, protruding outwardly away from said outer face, and having a hollow, cup shaped interior defined by a fully closed circular body base integral with said second end portion of said metal strip, and a body sidewall which is integral with said body base and extends outwardly to an enlarged rim surface with an axially adjacent mounting flange protruding radially inwardly therefrom;

a pair of flange projections protruding outward from said inner face of said metal strip, having an arcuate plan shape substantially similar to the plan shape of said body sidewall of said closure body, and disposed generally concentric with said insertion pin on opposite sides thereof, whereby in said sealed condition, said flange projections block access to at least portions of said mounting flange on said closure body to resist tampering; and a self-locking closing disk having a generally circular plan shape with an outer marginal edge portion securely retained between said rim surface and said mounting flange on said closure body, and a central aperture with radially inwardly protruding locking fingers with end edges that abuttingly engage said exterior surface of said insertion pin during assembly, and securely retain said two-piece closing seal in said sealed condition, whereby said first end portion of said metal strip is inserted through a portion of an article to be sealed, then flexed inwardly toward said medial portion, with said through aperture received over said insertion pin, and said second end portion of said metal strip is flexed inwardly toward said medial portion with said closure body and said closing disk mounted therein pressed onto said insertion pin over said first end portion of said metal strip, such that said locking fingers on said closing disk abuttingly engage said outside surface of said insertion pin to securely retain said two-piece closing seal in said sealed condition.

7. A two-piece closing seal as set forth in claim 6, wherein:

said first end portion of said metal strip has a predetermined width measured between opposing side edges thereof; and said closure body is laterally centered on said second end portion of said metal strip, and has an outside diameter that is greater than said predetermined width of said first end portion of said metal strip, such that at least portions of said body sidewall protrude laterally outwardly from said opposed side edges of said metal strip to provide additional sealing strength.

8. A two-piece closing seal as set forth in claim 7, wherein:

said medial portion of said metal strip includes a laterally enlarged region disposed adjacent said insertion pin which protrudes laterally outwardly from both of said side edges of said metal strip; and said pair of flange projections are supported on said enlarged region, have an inside diameter that is slightly larger than the outside diameter of said closure body, and are closely received between said flange projections in said sealed condition to provide additional sealing strength and tamper resistance.

9. A method for making a two-piece closing seal, comprising:

selecting an elongate, one-piece, integrally formed metal strip having mutually parallel, oppositely oriented inner and outer faces, and first and second oppositely disposed end portions with a medial portion positioned between the first and second end portions;

forming a cylindrically shaped insertion pin integrally in the metal strip adjacent the medial portion, so as to protrude outwardly away from the inner face with a hollow, cup-shaped interior defined by a fully closed circular pin base that is flush with the medial portion, and a folded over cylindrical pin sidewall which is integral with the pin base, has an exterior surface, and extends outwardly to a fully open top;

forming a connector through aperture in the metal strip adjacent the first end portion, so as to extend through both the inner and outer faces and with a circular plan shape that is closely received over the exterior surface of the insertion pin when the two-piece closing seal is in a sealed condition;

forming a cylindrically shaped closure body integrally in the metal strip adjacent said second end portion, so as to protrude outwardly away from the outer face, with a hollow, cup shaped interior defined by a fully closed circular body base integral with said second end portion of the metal strip, and a body sidewall which is integral with the body base and extends outwardly to an enlarged rim surface with an axially adjacent mounting flange protruding radially inwardly therefrom;

forming a self-locking closing disk having a generally circular plan shape with an outer marginal edge portion, and a central aperture with radially inwardly protruding locking fingers with end edges shaped to abuttingly engage the exterior surface of the insertion pin;

positioning the outer marginal edge portion of the closing disk on the rim surface of the closure body; and bending the mounting flange radially inwardly over the outer marginal edge portion of the closing disk until the disk is securely retained between the rim surface and the mounting flange on the closure body, whereby the first end portion of the metal strip is inserted through a portion of an article to be sealed, then flexed inwardly toward the medial portion, with the through aperture received over the insertion pin, and the second end portion of the metal strip is flexed inwardly toward the medial portion with the closure body and the closing disk mounted therein pressed onto the insertion pin over the first end portion of the metal strip, such that the locking fingers on the closing disk abuttingly engage the outside surface of the insertion pin to securely retain the two-piece closing seal in the sealed condition.

10. A method as set forth in claim 9, wherein:

said insertion pin forming step comprises deep drawing the metal strip by double the depth of the insertion pin and subsequently bending it back by the depth of the insertion pin.

11. A method as set forth in claim 10, wherein:

said closure body forming step comprises deep drawing the closure body from the metal strip.

12. A method for making a two-piece closing seal, comprising:

selecting an elongate, one-piece, integrally formed metal strip having mutually parallel, oppositely oriented inner and outer faces, and first and second oppositely disposed end portions with a medial portion positioned between the first and second end portions;

forming a cylindrically shaped insertion pin integrally in the metal strip adjacent the medial portion, so as to protrude outwardly away from the inner face with a hollow, cup-shaped interior defined by a circular pin base that is flush with the medial portion, and a cylindrical pin sidewall which is integral with the pin base, has an exterior surface, and extends outwardly to a top;

forming a connector through aperture in the metal strip adjacent the first end portion, so as to extend through both the inner and outer faces and with a circular plan shape that is closely received over the exterior surface of the insertion pin when the two-piece closing seal is in a sealed condition;

forming a cylindrically shaped closure body integrally in the metal strip adjacent said second end portion, so as to protrude outwardly away from the outer face with a hollow, cup shaped interior defined by a closed circular body base integral with said second end portion of the metal strip, and a body sidewall which is integral with the body base and extends outwardly to an enlarged rim surface with an axially adjacent mounting flange protruding radially inwardly therefrom;

forming a self-locking closing disk having a generally circular plan shape with an outer marginal edge portion, and a central aperture with radially inwardly protruding locking members with end edges shaped to abuttingly engage the exterior surface of the insertion pin;

positioning the outer marginal edge portion of the closing disk on the rim surface of the closure body; and bending the mounting flange radially inwardly over the outer marginal edge portion of the closing disk until the disk is securely retained between the rim surface and the mounting flange on the closure body, whereby the first end portion of the metal strip is inserted through a portion of an article to be sealed, then flexed inwardly toward the medial portion, with the through aperture received over the insertion pin, and the second end portion of the metal strip is flexed inwardly toward the medial portion with the closure body and the closing disk mounted therein pressed onto the insertion pin over the first end portion of the metal strip, such that the locking members on the closing disk abuttingly engage the outside surface of the insertion pin to securely retain the two-piece closing seal in the sealed condition.

* * * * *